US007191133B1

(12) United States Patent
Pettay

(10) Patent No.: US 7,191,133 B1
(45) Date of Patent: Mar. 13, 2007

(54) SCRIPT COMPLIANCE USING SPEECH RECOGNITION

(75) Inventor: Mark J. Pettay, Omaha, NE (US)

(73) Assignee: West Corporation, Omaha, NE (US)

( * ) Notice: Subject to any disclaimer, the term of this patent is extended or adjusted under 35 U.S.C. 154(b) by 597 days.

(21) Appl. No.: 09/785,048

(22) Filed: Feb. 15, 2001

(51) Int. Cl.
*G10L 21/00* (2006.01)
*G10L 15/26* (2006.01)
*G06F 11/34* (2006.01)

(52) U.S. Cl. ............... 704/270; 704/235; 379/265.06; 705/11

(58) Field of Classification Search ............... 704/273, 704/270.1, 275, 260, 240, 270, 257, 9, 251, 704/276, 250, 235; 204/244; 345/357; 705/16, 14, 11; 348/152; 395/2.79; 379/67, 379/265.06

See application file for complete search history.

(56) References Cited

U.S. PATENT DOCUMENTS

| 3,752,904 | A | | 8/1973 | Waterbury |
| 4,752,676 | A | | 6/1988 | Leonard et al. |
| 4,792,968 | A | | 12/1988 | Katz |
| 4,860,360 | A | | 8/1989 | Boggs |
| 4,993,068 | A | | 2/1991 | Piosenka et al. |
| 5,153,918 | A | | 10/1992 | Tuai |
| 5,287,429 | A | | 2/1994 | Watanabe |
| 5,412,727 | A | | 5/1995 | Drexler et al. |
| 5,414,755 | A | | 5/1995 | Bahler |
| 5,434,949 | A | | 7/1995 | Jeong |
| 5,504,805 | A | | 4/1996 | Lee |
| 5,513,250 | A | | 4/1996 | McAllister |
| 5,535,261 | A | | 7/1996 | Brown et al. |
| 5,581,630 | A | | 12/1996 | Bonneau, Jr. |
| 5,623,539 | A | * | 4/1997 | Bassenyemukasa et al. 704/270 |
| 5,625,748 | A | * | 4/1997 | McDonough et al. ........ 704/251 |
| 5,634,086 | A | * | 5/1997 | Rtischev et al. .......... 704/270.1 |
| 5,638,430 | A | | 6/1997 | Hogan et al. |
| 5,664,050 | A | | 9/1997 | Lyberg |
| 5,666,157 | A | * | 9/1997 | Aviv ........................... 348/152 |
| 5,742,929 | A | | 4/1998 | Källman et al. |
| 5,819,029 | A | | 10/1998 | Edwards |
| 5,838,768 | A | * | 11/1998 | Sumar et al. ............. 379/88.14 |
| 5,842,163 | A | | 11/1998 | Weintraub |

(Continued)

FOREIGN PATENT DOCUMENTS

WO      WO 2001/52510      7/2001

OTHER PUBLICATIONS

Witness Systems, Inc., online product brochure entitled "Your Focal Point for Measuring and Predicting Contact Center Performance," copyright date 2000.

(Continued)

*Primary Examiner*—David Hudspeth
*Assistant Examiner*—James S. Wozniak

(57) ABSTRACT

Apparatus and methods are provided for using automatic speech recognition to analyze a voice interaction and verify compliance of an agent reading a script to a client during the voice interaction. In one aspect of the invention, a communications system includes a user interface, a communications network, and a call center having an automatic speech recognition component. In a second aspect of the invention, a script compliance method includes the steps of conducting a voice interaction between an agent and a client and evaluating the voice interaction with an automatic speech recognition component adapted to analyze the voice interaction and determine whether the agent has adequately followed the script.

25 Claims, 5 Drawing Sheets

U.S. PATENT DOCUMENTS

| | | | |
|---|---|---|---|
| 5,862,325 A | | 1/1999 | Reed et al. |
| 5,867,559 A | * | 2/1999 | Jorgensen et al. .......... 379/67.1 |
| 5,872,834 A | | 2/1999 | Teitelbaum |
| 5,884,262 A | | 3/1999 | Wise et al. |
| 5,895,447 A | | 4/1999 | Ittycheriah et al. |
| 5,903,225 A | | 5/1999 | Schmitt et al. |
| 5,915,001 A | | 6/1999 | Uppaluru |
| 5,920,838 A | | 7/1999 | Mostow et al. |
| 5,940,476 A | | 8/1999 | Morganstein |
| 5,951,646 A | | 9/1999 | Brandon |
| 5,987,155 A | | 11/1999 | Dunn et al. |
| 6,011,858 A | | 1/2000 | Stock et al. |
| RE36,580 E | | 2/2000 | Bogosian, Jr. |
| 6,038,334 A | | 3/2000 | Hamid |
| 6,049,602 A | | 4/2000 | Foladare et al. |
| 6,058,303 A | * | 5/2000 | ANG.strom et al. ......... 455/413 |
| 6,058,363 A | | 5/2000 | Ramalingam |
| 6,064,963 A | | 5/2000 | Gainsboro |
| 6,070,241 A | | 5/2000 | Edwards |
| 6,084,967 A | | 7/2000 | Kennedy et al. |
| 6,091,835 A | | 7/2000 | Smithies et al. |
| 6,092,192 A | | 7/2000 | Kanevsky et al. |
| 6,094,476 A | | 7/2000 | Hunt et al. |
| 6,100,891 A | * | 8/2000 | Thorne ....................... 715/854 |
| 6,115,683 A | | 9/2000 | Burstein et al. |
| 6,115,693 A | | 9/2000 | McDonough et al. |
| 6,119,084 A | | 9/2000 | Roberts et al. |
| 6,144,938 A | * | 11/2000 | Surace et al. ............... 704/257 |
| 6,149,056 A | | 11/2000 | Stinson et al. |
| 6,163,768 A | | 12/2000 | Sherwood et al. |
| 6,167,255 A | * | 12/2000 | Kennedy et al. ......... 455/414.1 |
| 6,167,517 A | | 12/2000 | Gilchrist et al. |
| 6,263,049 B1 | | 7/2001 | Kuhn |
| 6,266,640 B1 | | 7/2001 | Fromm |
| 6,275,940 B1 | | 8/2001 | Edwards |
| 6,359,971 B1 | | 3/2002 | Haimi-Cohen |
| 6,370,508 B2 | * | 4/2002 | Beck et al. ..................... 705/1 |
| 6,377,928 B1 | * | 4/2002 | Saxena et al. ............... 704/275 |
| 6,401,066 B1 | * | 6/2002 | McIntosh .................... 704/273 |
| 6,501,956 B1 | * | 12/2002 | Weeren et al. ............... 455/463 |
| 6,567,787 B1 | * | 5/2003 | Walker et al. ................. 705/16 |
| 6,604,075 B1 | * | 8/2003 | Brown et al. ............. 704/270.1 |
| 6,650,736 B1 | | 11/2003 | Unger |
| 6,738,740 B1 | | 5/2004 | Barash |
| 6,868,154 B1 | * | 3/2005 | Stuart et al. ........... 379/265.06 |
| 2001/0014143 A1 | | 8/2001 | Kuhn |
| 2003/0147509 A1 | | 8/2003 | Steve |
| 2003/0154072 A1 | * | 8/2003 | Young et al. ................... 704/9 |

OTHER PUBLICATIONS

Witness Systems, Inc., webpage entitled "eQuality Balance Voice and Data Recording," copyright date 2001.
Witness Systems, Inc., webpage entitled "eQuality Evaluation Contact Evaluation," copyright date 2001.
Nice Systems, Ltd., webpages describing "NiceLog" system, copyright date 2001.
VoicePrint Security for Credit Cards, IBM Technical Disclosure Bulletin, Feb. 1994, pp. 189-190, vol. 37, Publication No. 2B.
PriceInteractive Launches Most Reliable Anti-Slamming Service New Enhanced Third Party Verification (TM) Solutions Cut Carrier Costs By More Than Half, PR Newswire via NewsEdge Corporation, Jul. 1, 1999.
Hill, Kimberly, Autonomy Digs into Contact-Center Market, CRMDaily.com, May 20, 2003.
Twersky, Roy, How Speech Analytics Solutions Help Telemarketing and Contact Centers, www.utopy.com, Aug. 11, 2003.
SER Acquires VorTecs, Move adds CTI and Speech rec to SER's outbound capabilities, www.cconvergence.com, Mar. 27, 2003.
Fast-Talk and VorTecs Join Forces to Unveil New Quality Management Solution, Press Release on www.fast-talk.com, Oct. 24, 2001.
VOICELOG, VoiceLog Announces Web Interface for Verification Retrievals and Audio Playback, Press Release, www.voicelog.com.
VOICELOG, VoiceLog Announces Dual Channel Recording, Press Release, www.voicelog.com, Jan. 4, 2000.
VOICELOG, VoiceLog Goes to the Ends of the Earth to Review Third Party Verification, Press Release, www.voicelog.com, Feb. 29, 2000.
VOICELOG, VoiceLog Announces Inbound that Delivers, Press Release, www.voicelog.com, Oct. 2, 2000.
VOICELOG, VoiceLog Announces "Pay As You Go" Call Logging, Press Release, www.voicelog.com, Jun. 26, 2003.
WITNESS SYSTEMS, Witness Systems Helps Improve Customer Service For Contact Centers Deploying Thin Client Architectures, Press Release, Mar. 6, 2001.
McKay, Jason P., Cyber Calling Cards, www.commweb.com, Jan. 22, 2001.

* cited by examiner

SCRIPT COMPLIANCE USING SPEECH RECOGNITION

FIELD OF THE INVENTION

Methods and apparatus are provided for using automatic speech recognition to analyze a voice interaction and verify compliance of an agent reading from a prepared script to a client during the voice interaction.

BACKGROUND OF THE INVENTION

Call centers are used by many industries to provide information by voice communication to a large number of customers or other interested parties. Telemarketing companies, for example, use call centers to process both inbound and outbound calls, mostly concerning offers of goods and services, but also to provide other information for company clients. Banks and financial institutions also use call centers, as do manufacturing companies, travel companies (e.g., airlines, auto rental companies, etc.), and virtually any other business having the need to contact a large number of customers, or to provide a contact point for those customers.

Telemarketing is a well-known form of remote commerce, that is, commerce wherein the person making the sale or taking the sales data is not in the actual physical presence of the potential purchaser or customer. In general operation, a prospective purchaser typically calls a toll-free telephone number, such as an 800 number. The number dialed is determined by the carrier as being associated with the telemarketer, and the call is delivered to the telemarketer's call center. A typical call center will have a front end with one or more voice response units (VRU), call switching equipment, an automatic call distributor (ACD), and several work stations having a telephone and computer terminal at which a live operator processes the call. The dialed number, typically taken automatically from the carrier (long distance) through use of the dialed number identification service (DNIS), is utilized to effect a database access resulting in a "screen pop" of a script on the operator's computer terminal, utilizing a computer telephone integration (CTI) network. In this way, when a prospective purchaser calls a given telephone number, a telemarketing operator may immediately respond with a script keyed to the goods or services offered. The response may be at various levels of specificity, ranging from a proffer of a single product, e.g., a particular audio recording, or may be for various categories of goods or services, e.g., where the dialed number is responded to on behalf of an entire supplier. Typically, the prospective purchaser is responding to an advertisement or other solicitation, such as a mail order catalog or the like, from which the telephone number is obtained.

In a typical telemarketing or customer service campaign, scripts are prepared for use by the call center agents handling incoming and/or outgoing telephone calls. Script preparation is a highly developed skill, and scripts are usually constructed to obtain optimum results and tested to confirm that such optimization is achieved. It is, therefore, potentially extremely damaging to a telemarketing campaign when the scripts are not followed by the call center agents, either in whole or in part. As a result, call center management typically includes one or more methods for overseeing script compliance, such as providing call center managers having the responsibility for ensuring such compliance by random sampling of calls or investigating under performance by specific agents, for example. Commercial recording and monitoring products are available, such as NiceLog® produced by NICE Systems Ltd. (Tel Aviv, Israel) or recording and analysis products produced by Witness Systems, Inc. (Roswell, Ga.). These products operate by recording call center voice interactions and capturing the agent's computer desktop activities, which are then available for review, either in real-time or in recorded form. These systems and methods are very labor intensive, inefficient, and non-comprehensive, and a need therefore exists for improved methods and apparatus for verifying script compliance in these situations.

The use of telephonic systems to effect commercial transactions is now well known. For example, in Katz U.S. Pat. No. 4,792,968, filed Feb. 24, 1987, and issued Dec. 20, 1988, entitled "Statistical Analysis System for Use With Public Communication Facility", an interactive telephone system for merchandising is disclosed. In one aspect of the disclosure, a caller may interact with an interactive voice response (IVR or VRU) system to effectuate a commercial transaction. For example, the caller may be prompted to identify themselves, such as through entry of a customer number as it may appear on a mail order catalog. In an interactive manner, the caller may be prompted to enter an item number for purchase, utilizing an item number designation from the catalog or otherwise interact with the system to identify the good or service desired. Provision is made for user entry of payment information, such as the entry of a credit card number and type identifier, e.g., VISA, American Express, etc. Options are provided for voice recording of certain information, such as name, address, etc., which is recorded for later processing, or in certain modes of operation, connecting the customer to a live operator for assistance.

More recent applications for electronic commerce are described in Katz PCT Publication No. WO94/21084, entitled "Interactive System for Telephone and Video Communication Including Capabilities for Remote Monitoring", published Sep. 15, 1994. In certain aspects, the application provides systems and methods for conduct of electronic commerce over communication networks, such as through the accessing of such resources via an on-line computer service, wherein the commercial transaction may be effected including some or all of dynamic video, audio and text data. Optionally, the system contemplates the interchange of electronic commerce commercial data, e.g., electronic data interchange (EDI) data, where on-line computer services are used by at least certain of the potential purchasers to interface the system, such as is used to access the Internet.

Automatic speech recognition (ASR) is a technology well known in the art, and several examples of applications of ASR technology are described in a number of United States patents. For example, in Boggs U.S. Pat. No. 4,860,360, filed Apr. 6, 1987, and issued Aug. 22, 1989, entitled "Method of Evaluating Speech," a speech quality evaluation process is described. The process incorporates models of human auditory processing and subjective judgement derived from psychoacoustic research literature, rather than the prior art use of statistical models that did not reflect the underlying processes of the auditory system.

Watanabe U.S. Pat. No. 5,287,429, filed Nov. 29, 1991, and issued Feb. 15, 1994, entitled "High Speed Recognition of a String of Words Connected According to a Regular Grammar by DP Matching," describes a speech recognition method using an input string of words represented by an input sequence of input pattern feature vectors. The input string is selected from a word set of first through n-th words and substantially continuously uttered in compliance with a regular grammar.

In Jeong U.S. Pat. No. 5,434,949, filed Aug. 13, 1993, and issued Jul. 18, 1995, entitled "Score Evaluation Display Device for an Electronic Song Accompaniment Apparatus," the described device has an audio signal processing unit to evaluate a user's singing. A sampling processor samples the difference between an input song signal from a microphone and reference song signal to generate an evaluation score.

In Lee U.S. Pat. No. 5,504,805, filed Apr. 5, 1993, and issued Apr. 2, 1996, entitled "Calling Number Identification Using Speech Recognition," a caller's telephone number is extracted from a recorded message using voice recognition. The called party initiates automatic dialing of the calling party's number after confirming that the number was correctly recognized by the system.

McDonough et al. U.S. Pat. No. 5,625,748, filed Apr. 18, 1994, and issued Apr. 29, 1997, entitled "Topic Discriminator Using Posterior Probability or Confidence Scores," describes an improved topic discriminator including an integrated speech recognizer or word and phrase spotter as part of a speech event detector, and a topic classifier trained on topic-dependent event frequencies. The phrase spotter is used to detect the presence of phrases without the need of parsing the output of a speech recognizer's hypothesized transcription.

In Rtischev et al. U.S. Pat. No. 5,634,086, filed Sep. 18, 1995, and issued May 27, 1997, entitled "Method and Apparatus for Voice-Interactive Language Instruction," a spoken-language apparatus is described having context-based speech recognition for instruction and evaluation, particularly language instruction and language fluency evaluation. The system administers a lesson, and particularly a language lesson, and evaluates performance in a natural interactive manner while tolerating strong foreign accents, and produces as an output a reading quality score.

Lyberg U.S. Pat. No. 5,664,050, filed Mar. 21, 1996, and issued on Sep. 2, 1997, entitled "Process for Evaluating Speech Quality in Speech Synthesis," describes a process for using a speech recognition system programmed using a number of persons. The system receives synthetic or natural speech and displays the differing speech quality.

Kallman et al. U.S. Pat. No. 5,742,929, filed May 28, 1996, and issued Apr. 21, 1998, entitled "Arrangement for Comparing Subjective Dialogue Quality in Mobile Telephone Systems," describes a system including a transmitter for transmitting a signal representing a correct dialogue quality and a speech recognition device for receiving and evaluating the received signal.

Weintraub U.S. Pat. No. 5,842,163, filed Jun. 7, 1996, and issued Nov. 24, 1998, entitled "Method and Apparatus for Computing Likelihood and Hypothesizing Keyword Appearance in Speech," describes a method using a scoring technique wherein a confidence score is computed as a probability of observing the keyword in a sequence of words given the observations. The method involves hypothesizing a keyword whenever it appears in any of the "N-best" word lists with a confidence score that is computed by summing the likelihoods for all hypotheses that contain the keyword.

In Ittycheriah et al. U.S. Pat. No. 5,895,447, filed Jan. 28, 1997, and issued Apr. 20, 1999, entitled "Speech Recognition Using Thresholded Speaker Class Model Selection or Model Adaptation", a speaker recognition system is provided including an arrangement for clustering information values representing respective frames of utterances of a plurality of speakers by speaker class in accordance with a threshold value to provide speaker class specific clusters of information, an arrangement for comparing information representing frames of an utterance of a speaker with respective clusters of speaker class specific clusters of information to identify a speaker class, and an arrangement for processing speech information with a speaker class dependent model selected in accordance with an identified speaker class.

Mostow et al. U.S. Pat. No. 5,920,838, filed Jun. 2, 1997, and issued Jul. 6, 1999, entitled "Reading and Pronunciation Tutor," describes a computer implemented reading tutor. A player outputs a response, and an input block implements a plurality of functions such as silence detection, speech recognition, etc. The tutor compares the output of the speech recognizer to the text which was supposed to have been read and generates a response, as needed, based on information in a knowledge base and an optional student model. The response is output to the user through the player.

Ramalingam U.S. Pat. No. 6,058,363, filed Dec. 29, 1997, and issued May 2, 2000, entitled "Method and System for Speaker-independent Recognition of User-Defined Phrases," comprises enrolling a user-defined phrase with a set of speaker-independent recognition models using an enrollment grammar. An enrollment grammar score of the spoken phrase may be determined by comparing features of the spoken phrase to the speaker-independent recognition models using the enrollment grammar.

Gainsboro U.S. Pat. No. 6,064,963, filed Dec. 17, 1997, and issued May 16, 2000, entitled "Automatic Key Word or Phrase Speech Recognition for the Corrections Industry," describes an automatic speech recognition (ASR) apparatus integrated into a call control system such that the ASR apparatus identifies key words in real-time or from a recording. The system is particularly applicable to the corrections industry for the purpose of spotting key words or phrases for investigative purposes or inmate control purposes which then can alert or trigger remedial action.

In Sherwood et al. U.S. Pat. No. 6,163,768, filed Jun. 15, 1998, and issued Dec. 19, 2000, entitled "Non-interactive Enrollment in Speech Recognition," a computer enrolls a user in a speech recognition system by obtaining data representing a user's speech, the speech including multiple user utterances and generally corresponding to an enrollment text, and analyzing acoustic content of data corresponding to a user utterance. The computer determines, based on the analysis, whether the user utterance matches a portion of the enrollment text.

None of these patents, however, describes a system or method for using automatic speech recognition to analyze a voice interaction and verify compliance of an agent reading from a script to a client during the voice interaction. Further, none of these patents describes a system or method for using automatic speech recognition to provide a quality assurance tool or for any other purpose in a call center environment.

SUMMARY OF THE INVENTION

Apparatus and methods are provided for using automatic speech recognition technology to analyze a voice interaction and verify compliance of an agent reading a script to a client during the voice interaction. The apparatus and methods are particularly suited for use in any situation where a voice interaction takes place in which at least one participant is obliged to follow a prepared script, and are particularly suited for use in the operation of a call center, such as, for example, to evaluate or verify that call center agents are properly reciting scripts during telephone or web-based calls to or from call center customers.

In one aspect, a communications system includes a voice communications network providing voice connectivity between a system user and a call center. The call center preferably includes a call control device for receiving and routing calls, one or more agent workstations at which an agent is able to process an incoming or outgoing call, and a script compliance module for analyzing a voice interaction between the system user and the agent. The system user is able to access the communications system with any type of voice communications device, including, for example, a telephone, a voice-capable computer, or a wireless communications device. The voice communications network is provided with any form of voice communications capability needed to support the user's voice communications device, such as a digital communications network, standard telephone network, internet-based, or wireless network. The call control device provides the functions of receiving the voice communication from the communications network and routing the call to the agent workstation. The agent workstation will typically include a telephone and a computer, with the computer being optionally networked to a database for data access by the agent.

The script compliance module is provided with an automatic speech recognition (ASR) component, such as that provided by a speaker-independent, continuous speech, multilingual, multi-dialect ASR component such as those known in the art. The ASR component is adapted to receive a digital signal representing a voice interaction between the system user and the agent, and to provide an output of an analysis of the digital signal for use in a quality assurance (QA) process.

In another aspect, a method is provided for analyzing a voice interaction and verifying compliance of an agent reading a script to a client during the voice interaction, for example, as part of a telemarketing campaign. The voice interaction preferably takes place between a system user and an agent over the communications network, but may alternatively be a face-to-face voice interaction or any voice interaction capable of being captured and analyzed by an ASR component. The agent may be physically located within the call center, or may be at a distant location, but the voice interaction is preferably routed through the call control device at the call center. In the preferred embodiment, the agent is responsible for referring to and following a prepared script for at least a portion of the voice interaction. The voice interaction is captured, converted to digital form, and exposed to the ASR component, in real-time or in a recorded form, and the ASR component analyzes at least a portion of the voice interaction. The analyzed portion is compared against a standard, preferably the expected content from the prepared script or script portion associated with the given portion of the voice interaction, and a determination is made concerning the extent to which the agent complied with the script during the voice interaction. For example, one or more portions of the voice interaction may be assigned a score to indicate a level of script compliance by the agent, as determined by the ASR component, and taking into account any limitations (e.g., confidence-level thresholds) in the ASR component's ability to evaluate the voice interaction.

In yet another aspect, one or more actions are taken based upon the above script compliance determination. In a preferred embodiment, these actions are taken as part of a quality assurance or employee incentive program. The actions include, for example, sending the voice interaction to a quality assurance monitor for review, assigning the agent for random voice interaction review, sending an e-mail or other flag to an oversight authority for review, sending a voice or text message to the agent, updating a file associated with the agent, updating an incentive program to reflect the compliance determination, or other such actions.

In yet another aspect, a scripting package and quality assurance process are constructed to provide panel-level review of a voice interaction during the quality assurance process. The scripting package preferably includes a plurality of call scripts used by the agent during the voice interaction, a log record layout including provision for each value logged during the voice interaction, and a plurality of ASR reference texts corresponding with the plurality of call scripts. The voice interaction is recorded and logged, including a timestamp and time displacement for each script panel occurring during the voice interaction. The quality assurance process includes a provision for retrieving and reviewing the recorded voice interaction by panel level. Accordingly, if a script compliance scoring system is used, the score may be retrieved and reviewed for each panel forming a part of the voice interaction without having to review the entire voice interaction.

Several advantages are obtained through use of the apparatus and methods so described. For example, the described apparatus and method provide a script compliance function having a wide range and scope of applications at a relatively minor expense when compared to non-automated management systems. By employing an ASR component to analyze and evaluate the voice interactions, a call center provider can decrease or avoid the need to have individual managers or other call reviewers perform those functions. This becomes particularly advantageous to call centers having several agents, perhaps dozens or hundreds, or where the agents are not physically located on the call center premises.

A further advantage obtained by the present apparatus and methods is the ability to provide useful information concerning agent script compliance to a quality assurance (QA) authority in a time-effective manner. For example, when the apparatus and methods are used in real-time, a report may be submitted automatically to a QA authority almost immediately after a given voice interaction is completed. Where the voice interaction is recorded and reviewed later, time delays may still be minimized. In addition, near instantaneous feedback may be given to an agent to attempt to minimize problems with script compliance.

A still further advantage of the described systems and methods is the provision of panel-level playback and review of a voice interaction in the quality assurance process. This provides more effective and efficient methods of quality assurance in, for example, a call center operation.

Other and further advantages are described below and still others will be apparent from a review of the descriptions contained herein.

The communications systems and script compliance methods may optionally include additional, or fewer, features and functionality than those described herein for the preferred embodiments while still obtaining the benefits described. The inventions described herein are not limited to the specific embodiments described, or to the specific equipment, features, or functionality described for the apparatus and methods of the examples contained herein. These examples are provided to illustrate, but not to limit the inventions described.

It is an object of these inventions to provide improved communications systems and methods.

It is yet a further object of these inventions to provide communications systems and methods that provide an improved script compliance verification function using automated speech recognition technology.

It is yet a further object of these inventions to provide communications systems and methods that improve the flexibility and options for staffing exemplary implementations, such as call centers.

It is yet a further object of these inventions to provide more efficient and effective quality assurance processes for use in, for example, call center operations.

DETAILED DESCRIPTION OF THE PREFERRED EMBODIMENTS

The preferred embodiments include several aspects generally directed to voice communications apparatus and methods, several of which are described below. The primary preferred embodiment is a script compliance apparatus and method particularly adapted for use in a call center, and most particularly in a telemarketing application. While this embodiment is described in detail herein, it will be understood by those skilled in the art that other and further aspects and applications are possible. For example, the systems and methods may be adapted for use in call centers for applications other than telemarketing, or for voice interactions not associated with call centers or telemarketing operations. The following description is not intended to limit the scope of the described inventions, which are instead set forth in the appended claims.

Figure 1:
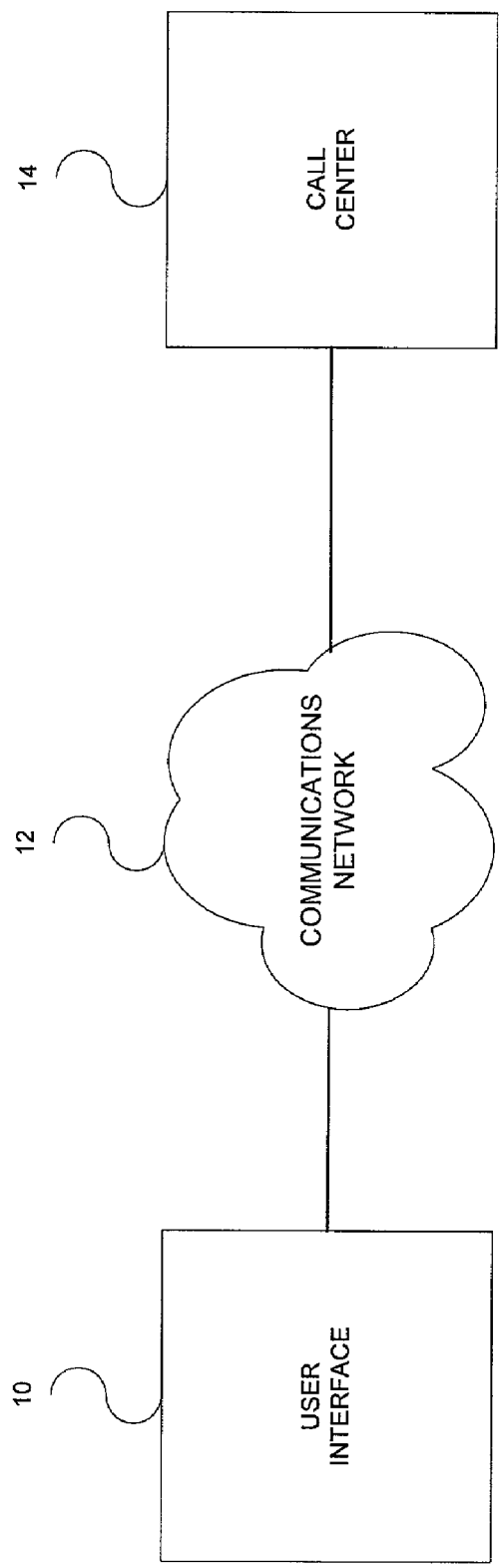
FIG. 1 is a block diagram demonstrating aspects of a communications system.

FIG. 1 shows a block diagram of one implementation of the apparatus and methods of these inventions. The diagram in FIG. 1 reflects aspects of a call center implementation, though it will be understood that the various structures and functionalities may be extended to other implementations, including face-to-face voice interactions, electronic commerce, telephone, web, or wireless-based based information services, and the like. The communications system shown in FIG. 1 includes a user interface 10, a communications network 12, and a call center 14, each described in further detail below.

The user interface 10 provides the function of allowing a system user, such as a telemarketing customer, to conduct a voice communication with a telemarketing services provider. The user interface 10 may be a standard function telephone, a video telephone, a wireless communication device, an internet-based communication device, or other instrument adapted to support voice communication. In the preferred embodiment, the user interface is a standard telephone.

The communications network 12 provides the function of transmitting a voice signal between the user interface and the call center. Accordingly, the communications network 12 may include an analog or digital telephone network, an internet-based network, a wireless network, or any voice communications supporting network. The communications network 12 supports voice communications between a system user using the user interface communication device and, in the preferred embodiment, the call center 14. In the preferred embodiment, the communications network is a standard telephone service network provided by a long distance and/or local service carrier such as AT&T, Sprint, MCI, or others.

The call center 14 serves as a call termination and servicing point, and may be provided having any number of features, functions, and structures. In the typical call center, a call control component is provided to automatically receive and route calls to one or more telemarketing agents working at agent workstations within the call center. An agent workstation may include only a telephone, but it is typically provided with a networked computer and terminal used to support the agent functions. For example, a central database containing customer information and information relating to goods, services, or other offerings being provided by the telemarketer is typically provided and is accessible by the computers and terminals located at the agent workstations. When a telemarketing call is being processed, information relating to that call (e.g., customer identification information, product offerings information, credit card information, etc.) are automatically sent by the central database to the agent terminal in a "screen pop." The agent then reads information from the computer terminal as the call is processed, and enters new information as it is obtained during the call.

Figure 2:
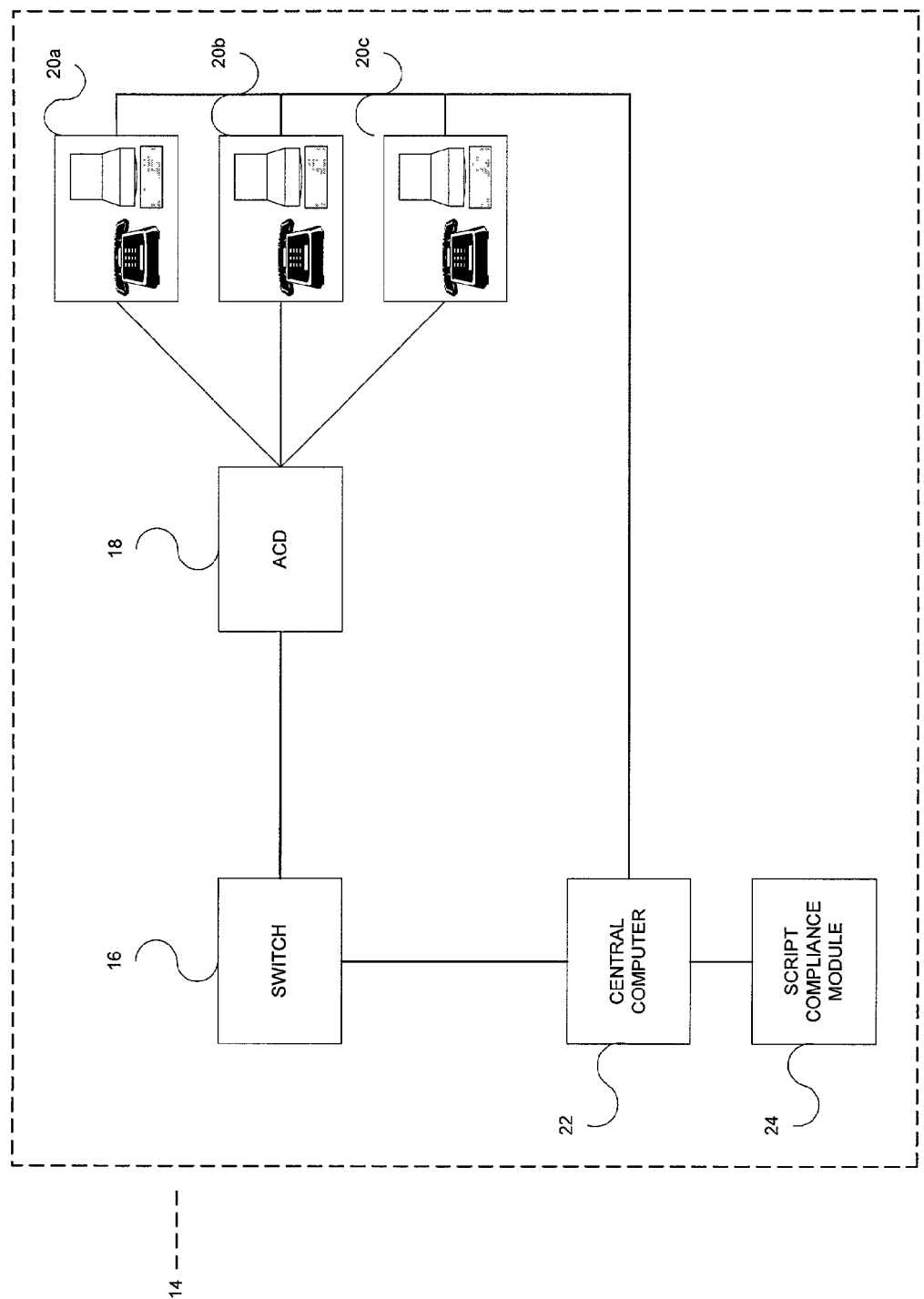
FIG. 2 is a block diagram showing a call center implementation of the described communications system.

FIG. 2 shows additional details of the call center 14 and, in particular, an embodiment representing an inbound call center. The call center 14 includes a programmable switch 16 that operates to receive incoming calls and to provide an interface for access to calls, call data, and other call center operations. The call center also preferably contains an automatic call distributor (ACD) 18 for routing calls to agents according to pre-determined criteria. While these primary functions of the switch and ACD are described, other details and functions of these devices are generally known in the art, and will not be discussed here.

Three agent workstations 20a–c are shown in the call center in FIG. 2. It is possible to have any number of agent workstations at the call center or, alternatively, to provide off-site agents that are able to access the call center remotely by another voice communications network not shown. In the case of an inbound telemarketing campaign using multiple agents, the switch and ACD cooperate to route calls to the appropriate location where an agent is able to process the calls. The agent workstation also includes a computer terminal at which data may be accessed by the agent. Typical call centers utilize computer-telephone integration (CTI) in which telephone number information (automatic number identification (ANI) or dialed number information service (DNIS)) is associated with other customer information stored on a database that is then accessed in real-time during a telemarketing call and a "screen pop" containing this information occurs at the agent workstation terminal. Additional information concerning the goods, services, or other offerings is also provided to the agent workstation terminal. A central computer 22 is shown in FIG. 2 having a network connection to each of the agent workstations, and a connection to the switch to obtain caller information from the incoming call. The details of the central computer and network are beyond the scope of the present inventions, and are therefore not discussed further here. Moreover, it is typical to provide a call center with other features and functions desired for a given call center application. Although these additional features and functions are not explicitly described herein, those skilled in the art will recognize that they may be added to the described system consistent with the needs of the given application.

In a particular preferred form, data is provided to the agent workstations during calls in a series of "panels", with each panel being associated with a particular script or portion of a script. The scripts are prepared as a part of a telemarketing campaign, and include the information needed to be given to the customer in a form intended to be effective and efficient to achieve its purpose. In particular, in a typical campaign, a telemarketer strives to obtain the most efficient result in the shortest transaction time in order to decrease on-line costs. The scripts are, therefore, typically highly-developed and tested to determine their effectiveness. A telemarketing campaign can be significantly undermined by an agent's failure to closely follow a script.

In addition, by presenting script information in panel form, a quality assurance process may preferably be coordinated with the scripting process to provide panel-level playback. This panel-level playback, as opposed to the need to play back and/or navigate through an entire telemarketing voice interaction to review a certain portion of it, is a significant advantage provided by the described system.

Accordingly, a script compliance module 24 is included in the call center. The script compliance module 24 is a software package that is shown in FIG. 2 as having an interface with the central computer, but its location within the call center is optional, as long as access is available to the digitized voice interaction. The script compliance module 24 performs several functions within the call center, as set forth in more detail below. The script compliance module includes an advanced speech recognition (ASR) component whereby a voice interaction between a customer and an agent may be analyzed and evaluated for compliance with an expected standard. As discussed below, the script compliance module may be constructed to operate in real-time, i.e., as the voice interaction takes place, or, preferably, it may include a recording capability such that voice interactions are reviewed and evaluated at a later time.

The ASR component of the script compliance module is supported by providing an appropriate ASR software package. These ASR software packages are commercially available, and examples include those available from Nuance Communications (Menlo Park, Calif.) and Speechworks International, Inc. (Boston, Mass.). A detailed description of speech recognition technology is not necessary to understand the systems and methods described herein. Briefly, however, the ASR component is adapted to capture a voice signal and convert it to digital form (if not presented to the ASR component in digital form already). The digital signal is then converted to a spectral representation that undergoes an analysis to match the spectral representation to a written vocabulary, and converts the voice signal to written text. Currently available systems are able to analyze continuous, multi-lingual, multi-dialect speech from in a speaker-independent manner and convert it to its corresponding text form.

As noted, the script compliance module 24 may be adapted to operate in real-time by including a component for converting the voice interaction to digital form for direct analysis by the ASR software package. In that case, the voice interactions are preferably captured live and fed directly to the digital converter and the ASR software package for analysis. Optionally, the script compliance module 24 may be adapted to analyze recorded voice interactions. In particular, and preferably, the script compliance module 24 or other system component may include one of the commercially available audio recording and monitoring systems such as those available from NICE Systems Ltd. or Witness Systems, Inc. In such a case, the voice interaction recorded by the audio recording and monitoring system may supply audio files to the ASR software package for analysis. Because recordings of the voice interactions may be useful to a call center administrator for other purposes, related or not to script compliance, the preferred embodiment includes a voice interaction recording component such as those described above.

Figure 3:
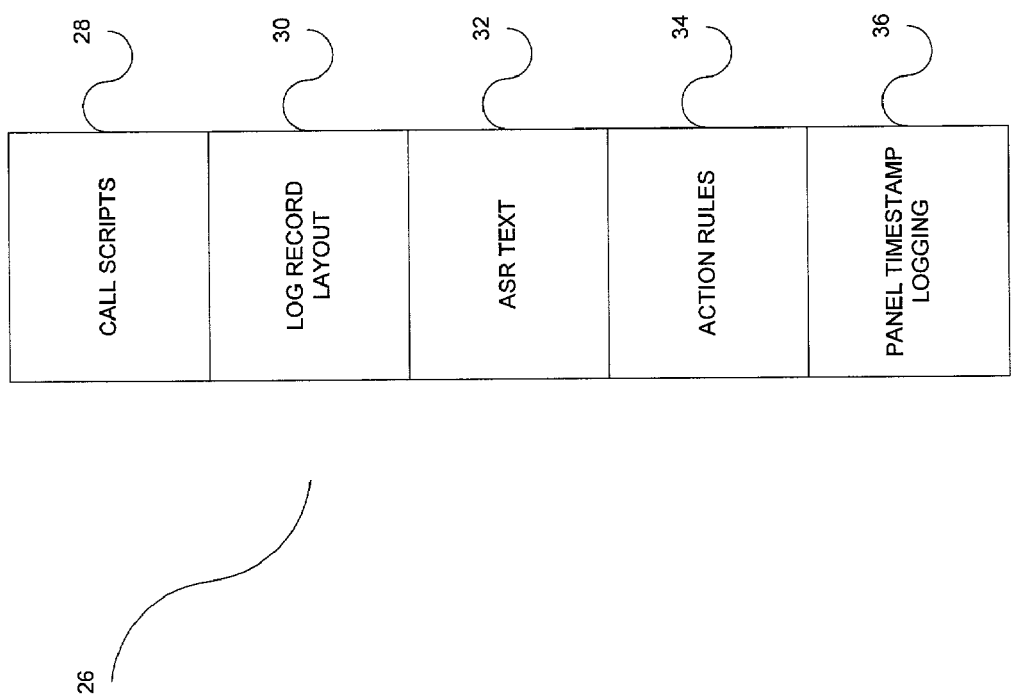
FIG. 3 is a block diagram of a scripting package for use in the described communications system and methods.

The script compliance module 24 preferably includes a scripting package 26, discussed in more detail below. The scripting package 26 is depicted graphically in FIG. 3, and includes the following components:

First, one or more call scripts 28 are provided. The call scripts 28 may be maintained in the script compliance module, or, preferably, they may be maintained on the central computer and accessible by the script compliance module. The call scripts 28 are accessed during the voice interaction and contain the information to be read by the agent to the customer during the voice interaction. As noted above, the call scripts 28 are preferably presented in separate panels containing discrete portions of the overall call script. As an agent progresses through a call, the agent moves from a first panel, to a second, to a third, and so on. A single offer of a good or service may be contained on a single panel, or on several panels. Alternatively, several offers may be presented during a single call.

Second, a log record layout module 30 is provided. A log record is preferably created for each voice interaction taking place at the call center. The log record layout includes data fields for all data that could be captured during calls, and log records are maintained as part of the ongoing function of the call center. The data fields will, of course, vary based upon the operation of the call center. Typical data fields will include date and time of call, length of call, agent identity, customer identity, and any transaction data obtained during the call. Some data fields may be filled automatically during a call, such as date, time, agent identity, and the like, while others may be filled by the agent during the call.

Third, an ASR text module 32 is provided. The ASR text is a reference text to be used by the ASR component of the script compliance module, and corresponds to the call scripts described above. As with the call scripts, the ASR text is preferably provided in separate panels.

Fourth, a set of action rules 34 is provided. In the most general sense, the action rules take the output of the ASR component evaluation of the voice interaction and, based thereon, direct an action to be taken by another component of the script compliance module. The output of the ASR component evaluation may comprise, for example, a numerical score indicating the degree to which the voice interaction complied with the ASR text. The actions directed by the set of action rules may comprise, for example, a quality assurance (QA) action to be taken based upon the numerical score. For example, scores less than 60 may be sent to a QA authority for review, scores between 60 and 80 may have random calls selected for review by a QA authority, and scores over 80 may be used to drive a QA incentive program. These are examples only. The determination of specific standards and actions will depend, of course, on the type of application.

Fifth, a panel timestamp logging feature 36 is provided. The panel timestamp logging feature assigns a time displacement timestamp to each panel as it is presented and viewed by an agent during a voice interaction with a customer. For example, in a voice interaction in which a first panel is processed in 15 seconds and a second panel is processed in 12 seconds, the first panel will log from 0:00:00 to 0:00:15 (i.e., the duration of the voice interaction relating to the first panel) and the next panel will log from 0:00:16 to 0:00:27. This progression continues for each panel used during the voice interaction. A log of the timestamps is maintained for each voice interaction. The timestamps are then preferably used in the quality assurance process to facilitate panel-level playback of the voice interaction.

Figure 4:
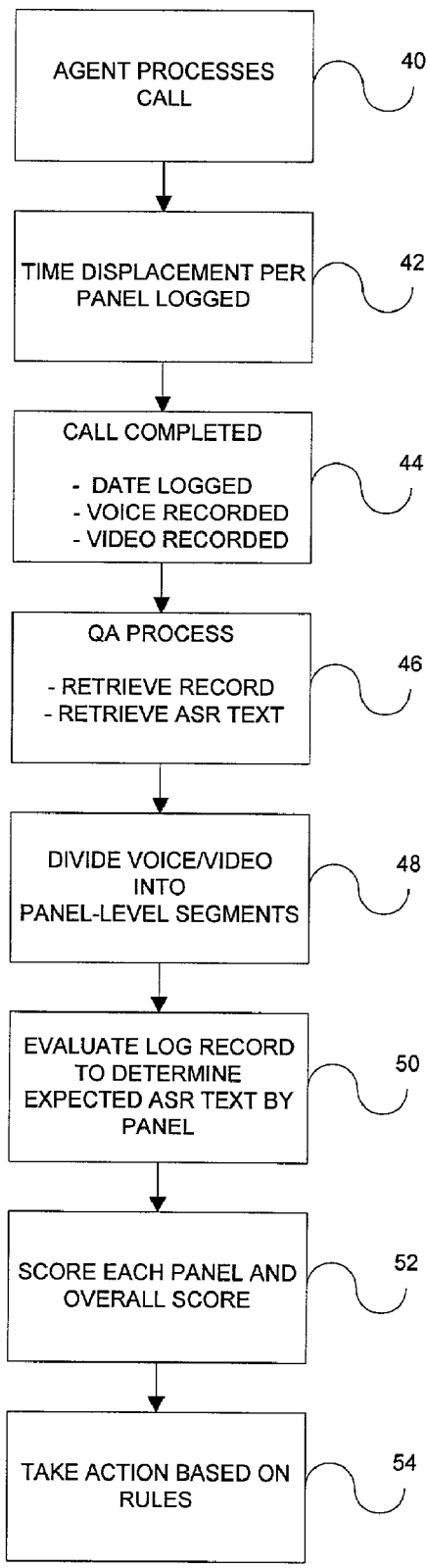
FIG. 4 is a block diagram of a quality assurance logging process and quality assurance method.

The communications system operation will now be described in reference to FIG. 4, and in the context of a telemarketing call. A telemarketing agent and a customer engage in a voice interaction during which the agent processes the call 40, i.e., the agent reads from scripts presented on the workstation terminal and enters information in the fields provided according to responses obtained from the customer. As noted above, the scripts are preferably presented to the agent in panels, with each panel corresponding to a portion of the overall script, or to a separate script. The time displacement per panel is logged 42 as a portion of the log record. Once the call is completed 44, all data obtained during the call is logged according to the log record layout. If a voice recording or video recording are made, they too are logged and stored for later use in the QA process.

The QA process 46 is next begun by retrieving the voice interaction record. The log record is also retrieved and reviewed to determine which scripts were to have been recited by the agent, and the corresponding ASR texts are retrieved for the ASR analysis. The voice and/or video recording is preferably divided into panel-level segments 48 for review and evaluation, and the log record is evaluated 50 to determine the expected ASR text by panel. A comparison of the voice interaction with the ASR text is then performed by the ASR component in order to determine the degree of compliance of the voice interaction with the ASR text. In the preferred embodiment, the ASR component assigns scores 52 based upon the level of accuracy of the comparison. Confidence-level thresholds are used in evaluating the match accuracy. After each panel is evaluated and scored, an overall score may be determined. The panel-level scores and overall scores are next used to determine any action 54 to be taken as provided in the pre-determined set of action rules. Examples of such actions include sending an e-mail containing the file for review, providing a feedback message to the agent, or other actions tailored to the particular application.

As an extension of the QA process, the stored voice interaction and log records may be retrieved from the system by a QA authority at a later time for additional analysis. The records may be used to review the assigned panel-level and/or overall compliance scores.

In addition, all or a portion of the voice and/or video recording may be played back for analysis. The logging process included in the scripting package allows panel-level playback of the voice interaction either in conjunction with, or independent from the ASR analyzing function of the system.

Figure 5:
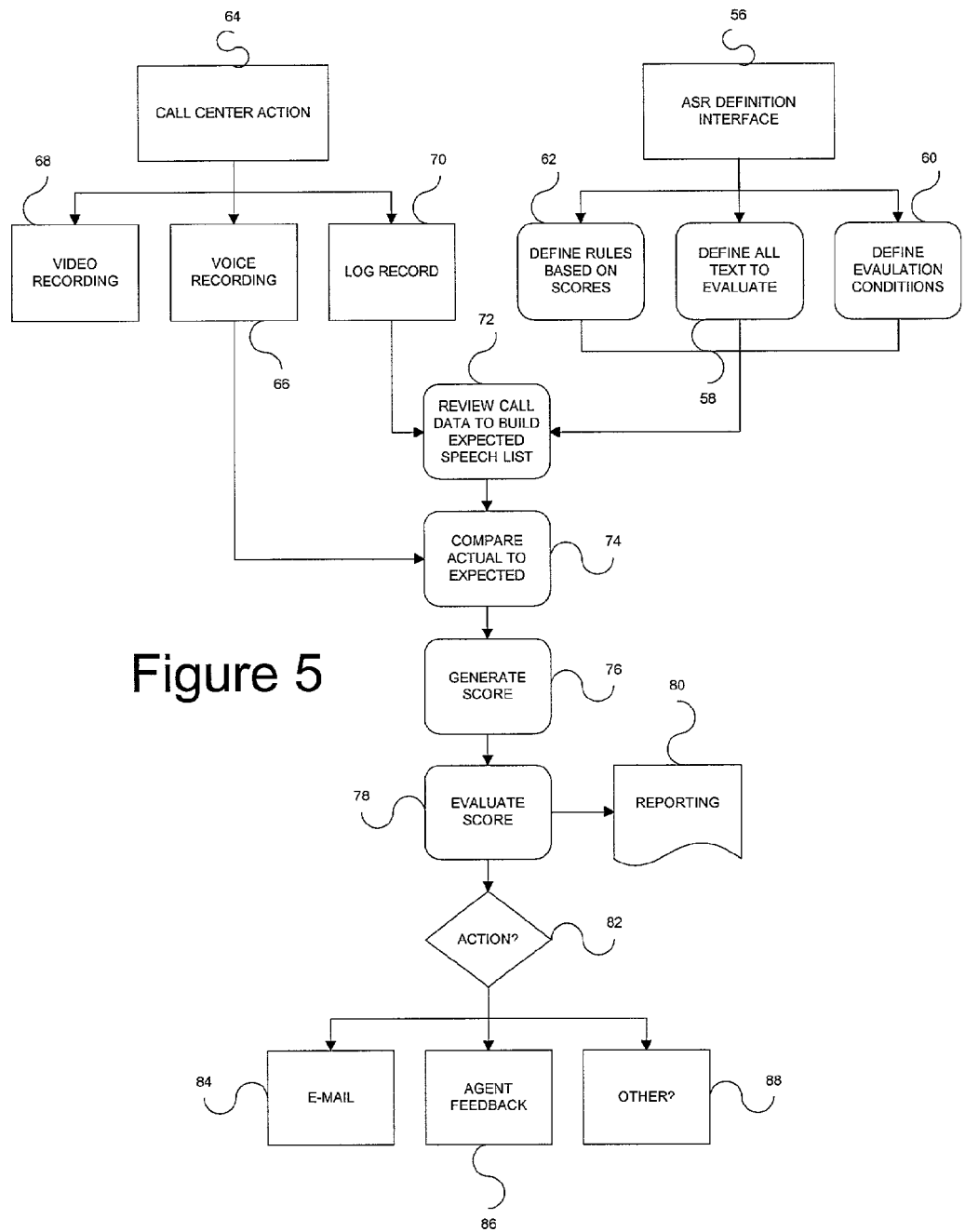
FIG. 5 is a block diagram showing a number of call center actions forming part of the communications system and methods.

A block diagram providing an additional representation of the call center actions is shown in FIG. 5. The ASR Interface 56 is used to set the initial conditions of the ASR component of the script compliance module. The initial conditions of the ASR component include the definitions of the ASR texts 58, the definitions of the evaluation conditions 60—i.e., the point in time during a voice interaction a given ASR text is expected to be read—and the action rules 62, discussed above. Any changes or modifications to the initial conditions are made by accessing these features via the ASR Interface 56 and making the desired changes.

When a call is processed 64, a voice recording is made 66 and, optionally, a video recording 68 is made. Each of these recordings may be separately logged and stored for later retrieval as needed. A log record 70 is created of the voice interaction during the call and is used, along with the ASR initial conditions, to build an expected speech list 72 to which the voice recording will be compared. For example, as a call is processed, the agent will view, read from, and enter information into several panels according to the nature and flow of the call. The interactive logic concerning all branching of the scripts and panels provided to the agent during the call is maintained on the central computer or, alternatively, in the script compliance module, and dictates which call scripts are presented to the agent at each step of the call. The evaluation conditions contain the information coordinating the voice interaction, scripts, panels, and ASR texts. These are used to build the expected speech list.

The actual voice recording is then compared 74 to the ASR text to determine compliance. A score is generated 76 indicating the measured compliance, taking into account the confidence-level thresholds of the ASR component, and the score is evaluated 78 against pre-determined standards. The pre-determined standards may be static or may vary, and may be included in the ASR evaluation conditions. For example, an 80% accuracy score may be sufficient for one script or script portion, but a 90% accuracy score may be required for another script or portion. The score and evaluation may be added to a report 80 of the call for later retrieval. An action 82 is next taken based upon the score according to the pre-determined set of action rules. Examples of these actions include e-mailing a report (which may optionally include a copy of the digital recording of the voice interaction) to a QA authority 84, providing a feedback message directly to the agent 86, or any other 88 action appropriate for the given application. The foregoing cited references, patents and publications are hereby incorporated herein by reference, as if fully set forth herein. Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A script compliance method for evaluating compliance of a live agent with a script from which the live agent reads when conducting a voice interaction with a live customer, the method comprising at least the following:
    conducting the voice interaction between the live agent and the live customer in accordance with the script,
    dividing data representing a portion of the voice interaction into a plurality of panels after being spoken by the live agent, wherein the panels correspond to respective sections of the script, wherein the dividing is based upon timestamps of the panels, and wherein the panels correspond to a single offer of a good or service, and
    evaluating data representing a portion of the voice interaction with an automatic speech recognition component adapted to analyze the portion of the voice interaction and to determine a score representing a degree with which the live agent complied with the script during the portion of the voice interaction.

2. The script compliance method of claim 1 wherein said live agent is a telemarketing agent.

3. The script compliance method of claim 2 wherein said script includes an offer of goods or services.

4. The script compliance method of claim 1 wherein said voice interaction is carried on a communications network.

5. The script compliance method of claim 4 wherein said communications network is a publicly switched telephone network (PSTN).

6. The script compliance method of claim 4 wherein said communications network is the internet.

7. The script compliance method of claim 4 wherein said communications network includes a wireless component.

8. The script compliance method of claim 4, wherein said voice interaction is a telephone call.

9. The script compliance method of claim 8, wherein said telephone call is initiated by said live customer client.

10. The script compliance method of claim 1 wherein evaluating includes:
    converting data representing said voice interaction into a digital signal comprising a spectral representation of said voice interaction,
    comparing said digital signal to a reference standard comprising a known vocabulary, and
    matching said digital signal to words and phrases contained in said reference standard.

11. The script compliance method of claim 1 further comprising:
    performing an action based upon a determination obtained from said evaluating.

12. The script compliance method of claim 11, wherein performing an action comprises transmitting a signal to said live agent corresponding to said determination.

13. The script compliance method of claim 11, wherein performing an action comprises transmitting a signal to a reviewing authority corresponding to said determination.

14. The script compliance method of claim 11, wherein performing an action comprises causing an entry to be made in a script compliance incentive system.

15. The script compliance method of claim 1, further comprising:
    reviewing the determination of the score.

16. The script compliance method of claim 1, wherein the score is assigned by the automatic speech recognition component.

17. The script compliance method of claim 1, further comprising assigning a respective score to each panel.

18. A system for evaluating compliance of a live agent with a script from which the live agent reads when conducting a voice interaction with a live customer via a communication network adapted to support the voice interaction, the system comprising at least the following:
    a script compliance module including at least an automatic speech recognition component adapted to analyze data representing a portion of the voice interaction spoken by the live agent, the data being divided into a plurality of panels after being spoken by the live agent, with the panels corresponding to respective sections of the script, wherein the data being divided is based upon timestamps of the panels, and wherein the panels correspond to a single offer of a good or service, and to determine a score representing a degree with which the live agent complied with the script during that portion of the voice interaction, and
    means for causing one or more actions to be taken based upon the determination by the automatic speech recognition component.

19. The system of claim 18 further comprising a call center including a plurality of agent workstations.

20. The system of claim 19 wherein each said agent workstation includes a telephone and a computer terminal.

21. The system of claim 18 wherein said live agent is a telemarketing agent.

22. The system of claim 18 wherein said live agent is a customer service agent.

23. The system of claim 18 wherein said means for causing one or more actions comprises means for transmitting a signal to said live agent corresponding to said determination.

24. The system of claim 18 wherein said means for causing one or more actions comprises means for transmitting a signal to a reviewing authority corresponding to said determination.

25. The system of claim 18 wherein said means for causing one or more actions comprises means for causing an entry to be made in a script compliance incentive system.

* * * * *